(12) United States Patent
Wrong

(10) Patent No.: US 8,621,960 B2
(45) Date of Patent: Jan. 7, 2014

(54) SINGLE MOTOR POWER SEAT

(75) Inventor: David J Wrong, Newmarket (CA)

(73) Assignee: Magna Seating Inc, Aurora, Ontario (CA)

( * ) Notice: Subject to any disclaimer, the term of this patent is extended or adjusted under 35 U.S.C. 154(b) by 203 days.

(21) Appl. No.: 13/316,638

(22) Filed: Dec. 12, 2011

(65) Prior Publication Data

US 2012/0160056 A1    Jun. 28, 2012

Related U.S. Application Data

(60) Provisional application No. 61/426,108, filed on Dec. 22, 2010.

(51) Int. Cl.
*F16H 37/06* (2006.01)

(52) U.S. Cl.
USPC ................ 74/665 A; 74/665 GA; 297/344.13

(58) Field of Classification Search
USPC .......... 74/665 A, 665 B, 665 GA; 297/344.13
See application file for complete search history.

(56) References Cited

U.S. PATENT DOCUMENTS

| | | | | |
|---|---|---|---|---|
| 3,241,384 A | * | 3/1966 | Grimm | 74/353 |
| 3,564,935 A | * | 2/1971 | Vigneri | 74/354 |
| 4,299,316 A | * | 11/1981 | Reinmoeller | 192/48.8 |
| 4,470,318 A | | 9/1984 | Cremer et al. | |
| 4,932,290 A | | 6/1990 | Toyoda et al. | |
| 5,088,841 A | * | 2/1992 | Ikegaya et al. | 297/344.1 |
| 5,163,734 A | | 11/1992 | Hakansson | |
| 5,292,164 A | * | 3/1994 | Rees | 296/65.15 |
| 5,303,881 A | * | 4/1994 | Aronne | 244/122 R |
| 5,427,345 A | | 6/1995 | Yamakami et al. | |
| 5,882,075 A | | 3/1999 | Partington et al. | |
| 6,126,132 A | | 10/2000 | Maue | |
| 6,626,064 B1 | | 9/2003 | Maue et al. | |

* cited by examiner

*Primary Examiner* — Ha D Ho
(74) *Attorney, Agent, or Firm* — Miller Canfield

(57) ABSTRACT

A multi-output transmission assembly includes first and second gears rotatable in opposite directions, an output shaft, first and second collars slidably coupled to the output shaft, and an actuator coupled to the first and second collars. The first collar is rotated by the first gear in a first direction. The second collar is rotated by the second gear in a second direction. The actuator moves the first and second collars along the output shaft. With the actuator in a neutral position, the first and second collars are disengaged from the output shaft and the output shaft does not rotate. With the actuator in a first position, the first collar engages the output shaft and the output shaft rotates in the first direction. With the actuator in a second position, the second collar engages the output shaft and the output shaft rotates in the second direction.

21 Claims, 8 Drawing Sheets

SINGLE MOTOR POWER SEAT

BACKGROUND OF THE INVENTION

1. Field of the Invention

The invention relates to a motor vehicle seat assembly, and more particularly to a power seat adjuster including a single motor and a multi-output transmission assembly to provide the desired adjustability of the seat assembly.

2. Description of Related Art

Motor vehicles include seat assemblies having a seat cushion and a seat back for supporting occupants within the vehicle. Most front row seat assemblies, such as driver and passenger seat assemblies, are adjustably mounted on a floor of the vehicle. It is common that such seat assemblies include power seat adjusters for adjusting the position of the seat assembly relative to the vehicle floor. A typical power seat adjuster can be operated to adjust the seat assembly in a generally horizontal or fore/aft direction and a generally vertical or up/down direction.

The generally horizontal or fore/aft direction of the seat assembly corresponds to a longitudinal axis of the vehicle. Movement of the seat assembly along the longitudinal axis moves the seat assembly closer to or farther away from the vehicle steering wheel and/or instrument panel. To allow fore and aft adjustment, the seat assembly typically includes a seat track mechanism having an upper track slidably coupled with a lower track. The upper track is attached to an underside of the seat cushion and the lower track is attached to the vehicle floor. A threaded lead screw is driven by a first electric motor and a nut translating along the lead screw is connected to and moves the upper track relative to the lower track, thereby moving the seat assembly in the fore/aft direction.

For the generally vertical or up/down direction of the seat assembly, front and rear portions of the seat cushion are typically controlled separately. A first gear mechanism is disposed between the upper track and the front portion of the seat cushion and a second gear mechanism is disposed between the upper track and the rear portion of the seat cushion. The first gear mechanism is actuated by a second electric motor to allow up and down adjustment of the front portion of the seat cushion. Similarly, the second gear mechanism is actuated by a third electric motor to allow up and down adjustment of the rear portion of the seat cushion. Thus, simultaneous actuation of the second and third electric motors moves the entire seat cushion in the up/down direction.

The power seat adjuster can also be configured to pivot or recline the seat back relative to the seat cushion. A recliner mechanism is disposed between the seat back and the seat cushion. The recliner mechanism is actuated by a fourth electric motor to allow pivotal movement of the seat back.

As described above, conventional power seat adjusters can include four or more electric motors for providing adjustment of the seat assembly. While the use of multiple electric motors is effective in adjusting the position of the seat assembly, the cost of the electric motors is relatively expensive and increases the weight and complexity of the seat assembly. It is therefore desirable to provide an improved power seat adjuster using a single motor to provide the desired adjustability of the seat assembly.

SUMMARY OF THE INVENTION

According to one aspect of the invention, a multi-output transmission assembly for a power seat adjuster includes an input shaft that actuates a first gear set and a second gear set. A first output shaft includes a first male spline lock, a second male spline lock, and a third male spline lock disposed laterally between the first and second male spline locks. A first collar is slidably coupled to the first output shaft and is rotated by the first gear set in a first rotational direction. The first collar includes a first female spline lock for selectively engaging the first male spline lock on the first output shaft. A second collar is slidably coupled to the first output shaft and is rotated by the second gear set in a second rotational direction, opposite the first rotational direction. The second collar includes a second female spline lock for selectively engaging the second male spline lock on the first output shaft. A first actuator is adapted for selectively engaging the third male spline lock on the first output shaft. The first actuator is coupled to the first and second collars and moves the first and second collars laterally along the first output shaft. With the first actuator in a neutral position, the first actuator engages the third male spline lock to prevent rotation of the first output shaft. With the first actuator in a first position, the first female spline lock on the first collar engages the first male spline lock to rotate the first output shaft in the first rotational direction in response to actuation of the first gear set. With the first actuator in a second position, the second female spline lock on the second collar engages the second male spline lock to rotate the first output shaft in the second rotational direction in response to actuation of the second gear set. The assembly may also include second, third, and fourth output shafts driven in the first and second rotational directions by the first and second gear sets.

According to another aspect of the invention, a multi-output transmission assembly is provided for a power seat adjuster. The transmission assembly includes a first input gear that is selectively rotatable in a first rotational direction and a second input gear that is selectively rotatable in a second rotational direction, opposite the first rotational direction. An output shaft includes a first male spline lock and a second male spline lock that are laterally spaced apart. A first collar is slidably coupled to the output shaft and is rotated by the first input gear in the first rotational direction. The first collar includes a first female spline lock for selectively engaging the first male spline lock on the output shaft. A second collar is slidably coupled to the output shaft and is rotated by the second input gear in the second rotational direction. The second collar includes a second female spline lock for selectively engaging the second male spline lock on the output shaft. An actuator is adapted for selectively engaging the second male spline lock on the output shaft. The actuator is coupled to the first and second collars and moves the first and second collars laterally along the output shaft. With the actuator in a neutral position, the actuator engages the second male spline lock to prevent rotation of the output shaft. With the actuator in a first position, the first female spline lock on the first collar engages the first male spline lock to rotate the output shaft in the first rotational direction in response to rotation of the first input gear in the first rotational direction. With the actuator in a second position, the second female spline lock on the second collar engages the second male spline lock to rotate the output shaft in the second rotational direction in response to rotation of the second input gear in the second rotational direction.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
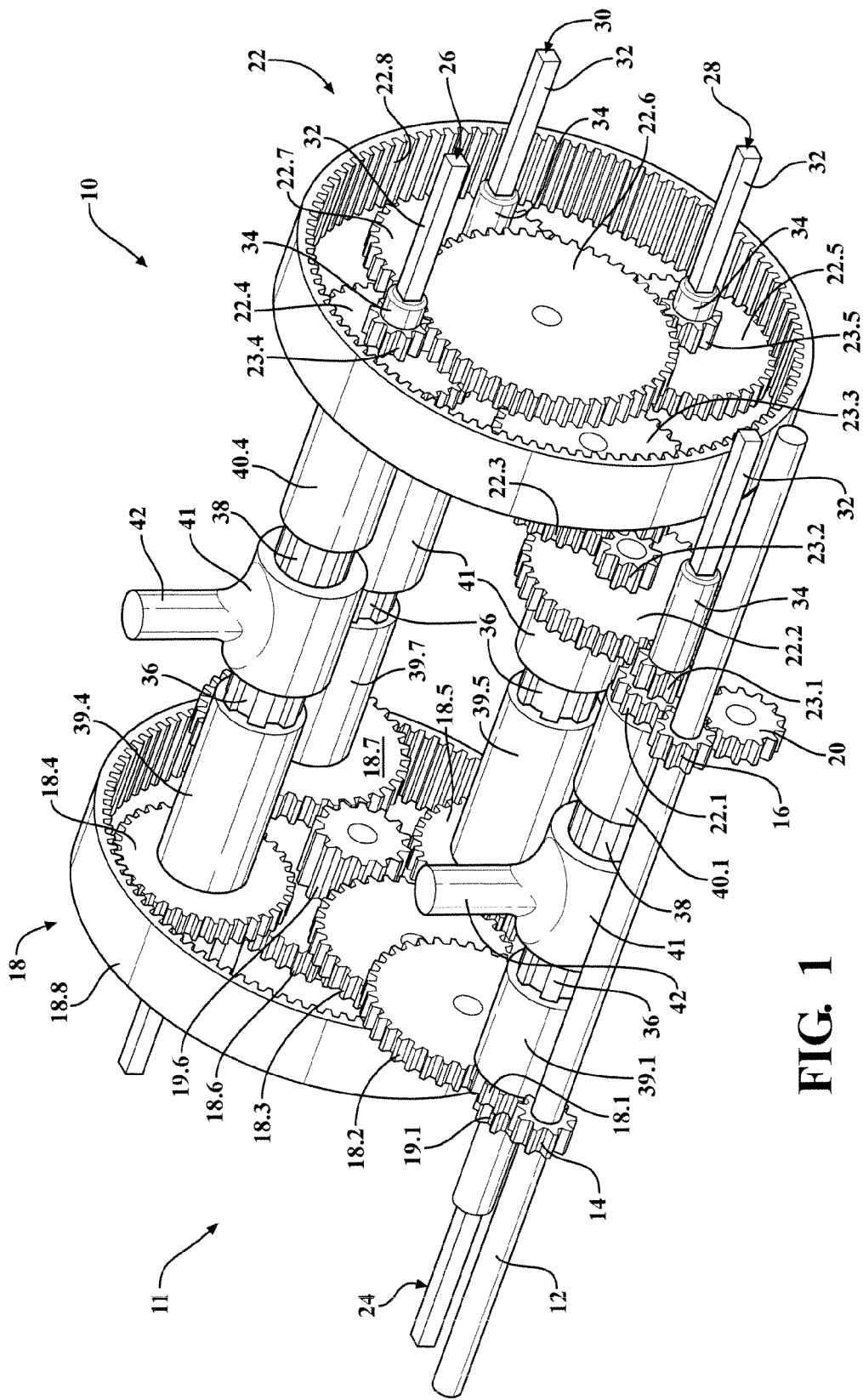
FIG. 1 is a perspective view of a multi-output transmission assembly for a power seat adjuster according to a first embodiment of the invention.
Figure 2:
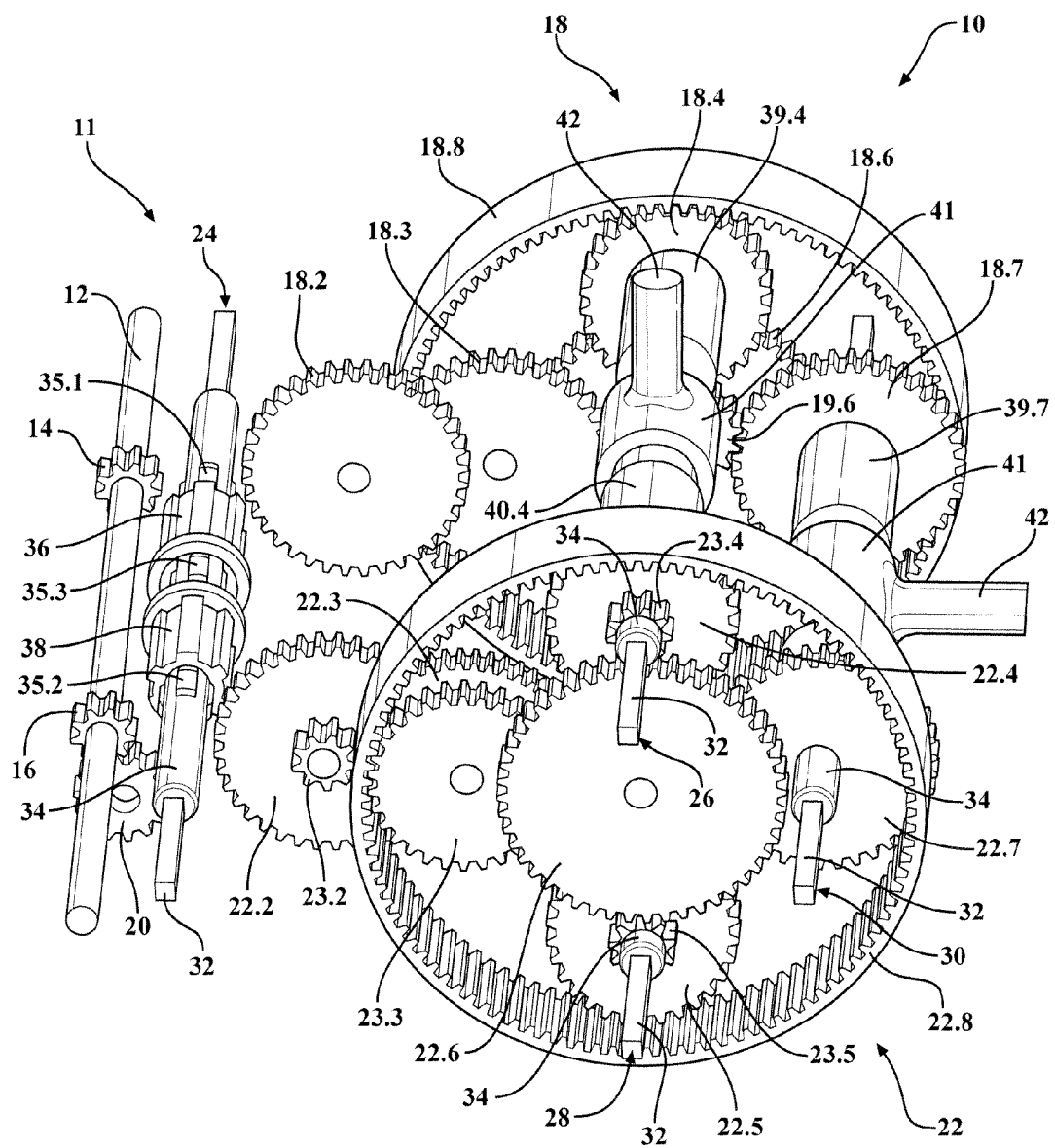
FIG. 2 is a first, fragmentary, perspective view of the multi-output transmission assembly of FIG. 1.
Figure 3:
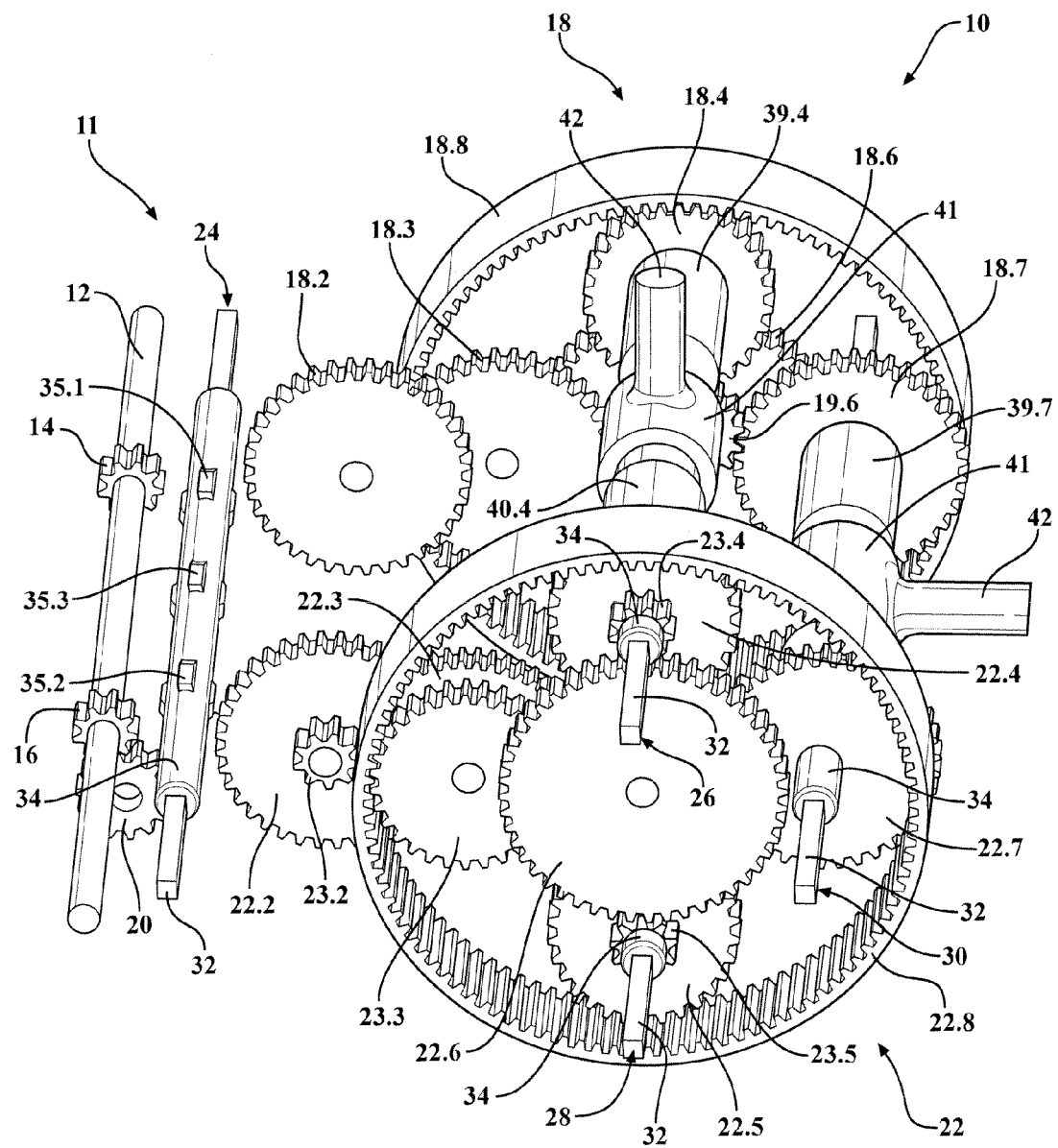
FIG. 3 is a second, fragmentary, perspective view of the multi-output transmission assembly of FIG. 1.

Referring to FIGS. 1 through 3, a power seat adjuster 10 for a motor vehicle seat assembly includes a single motor (not shown) that is coupled to a multi-output transmission assembly 11. The power seat adjuster 10 is adapted for providing the desired adjustability of the seat assembly. The transmission assembly 11 includes a housing (not shown) and an input shaft 12 driven by the motor. First and second drive gears 14, 16 are mounted on the input shaft 12 for rotation therewith. The first drive gear 14 actuates or drives a first gear set 18. The first gear set 18 is comprised of a plurality of gears 18.1, 18.2, 18.3, 18.4, 18.5, 18.6, 18.7 and a first ring gear 18.8. More specifically, the first drive gear 14 meshingly engages a first gear 18.1; a step down portion 19.1 of the first gear 18.1 meshingly engages a second gear 18.2; a step down portion (not shown) of the second gear 18.2 meshingly engages a third gear 18.3; a step down portion (not shown) of the third gear 18.3 meshingly engages the first ring gear 18.8; the first ring gear 18.8 meshingly engages fourth and fifth gears 18.4, 18.5; step down portions (not shown) of the fourth and fifth gears 18.4, 18.5 meshingly engage a sixth gear 18.6; and a step down portion 19.6 of the sixth gear meshingly engages a seventh gear 18.7.

The second drive gear 16 actuates or drives a second gear set 22. The second gear set 22 is comprised of a plurality of gears 22.1, 22.2, 22.3, 22.4, 22.5, 22.6, 22.7 and a second ring gear 22.8. More specifically, the second drive gear 16 meshingly engages a reverse idler gear 20, which in turn meshingly engages an eighth gear 22.1; a step down portion 23.1 of the eighth gear 22.1 meshingly engages a ninth gear; 22.2; a step down portion 23.2 of the ninth gear 22.2 meshingly engages a tenth gear 22.3; a step down portion 23.3 of the tenth gear 22.3 meshingly engages the second ring gear 22.8; the second ring gear 22.8 meshingly engages eleventh and twelfth gears 22.4, 22.5; step down portions 23.4, 23.5 of the eleventh and twelfth gears 22.4, 22.5 meshingly engage a thirteenth gear 22.6; and a step down portion (not shown) of the thirteenth gear 22.6 meshingly engages a fourteenth gear 22.7.

The transmission assembly 11 also includes four output shafts, namely, a first output shaft 24, a second output shaft 26, a third output shaft 28, and a fourth output shaft 30. The first gear set 18 selectively drives each output shaft 24, 26, 28, 30 in a first rotational direction, for example, counterclockwise when viewed from FIG. 1. The second gear set 22 selectively drives each output shaft 24, 26, 28, 30 in a second rotational direction, for example, clockwise when viewed from FIG. 1. Each output shaft 24, 26, 28, 30 includes an inner shaft portion 32 extending through and fixed to an outer shaft portion 34. The inner shaft portion 32 of each one of the first, second, third, and fourth output shafts 24, 26, 28, 30 is operatively coupled to an adjustment device for moving a portion of the seat assembly. For example, the inner shaft portion 32 of the first output shaft 24 is operatively coupled to a pair of seat track drives (not shown) for moving the seat assembly fore and aft. The inner shaft portion 32 of the second output shaft 26 is operatively coupled to a front lift drive (not shown) for lifting or ing a front end of a seat cushion. The inner shaft portion 32 of the third output shaft 28 is operatively coupled to a rear lift drive (not shown) for lifting a rear end of the seat cushion. The inner shaft portion 32 of the fourth output shaft 30 is operatively coupled to a recliner drive (not shown) for pivoting a seat back relative to the seat cushion.

Referring to FIG. 3, the outer shaft portion 34 of each output shaft 24, 26, 28, 30 includes three male spline locks that are laterally spaced apart, namely, a first male spline lock 35.1, a second male spline lock 35.2, and a third male spline lock 35.3. The third male spline lock 35.3 is disposed laterally between the first and second male spline locks 35.1, 35.2. First and second collars 36, 38 are slidably mounted on the outer shaft portion 34 of each output shaft 24, 26, 28, 30, as shown in FIGS. 1 and 2. The first gear 18.1 includes a shoulder 39.1 that is internally splined. The first collar 36 is externally splined and is engaged with the internal splines of the shoulder 39.1 of the first gear 18.1 to rotate therewith. The first collar 36 also includes a first female spline lock (not shown) that is adapted for selectively engaging with the first male spline lock 35.1 on the outer shaft portion 34 of the first output shaft 24. Similarly, the eighth gear 22.1 includes a shoulder 40.1 that is internally splined. The second collar 38 is externally splined and is engaged with the internal splines of the shoulder 40.1 of the eighth gear 22.1 to rotate therewith. The second collar 38 also includes a second female spline lock (not shown) that is adapted for selectively engaging with the second male spline lock 35.2 on the outer shaft portion 34 of the first output shaft 24.

Each of the second, third, and fourth output shafts 26, 28, 30 include similar arrangements. More specifically, the fourth gear 18.4 includes a shoulder 39.4 that is internally splined and is engaged with the external splines of the first collar 36 on the second output shaft 26. Likewise, the eleventh gear 22.4 includes a shoulder 40.4 that is internally splined and is engaged with the external splines of the second collar 38 on the second output shaft 26. The fifth gear 18.5 includes a shoulder 39.5 that is internally splined and is engaged with the external splines of the first collar 36 on the third output shaft 28. Likewise, the twelfth gear 22.5 includes a shoulder (not shown) that is internally splined and is engaged with the external splines of the second collar (not shown) on the third output shaft 28. Finally, the seventh gear 18.7 includes a shoulder 39.7 that is internally splined and is engaged with the external splines of the first collar 36 on the fourth output shaft 30. Likewise, the fourteenth gear 22.7 includes a shoulder (not shown) that is internally splined and is engaged with the external splines of the second collar (not shown) on the fourth output shaft 30.

An actuator 41 with an actuation pin 42 is disposed along each one of the output shafts 24, 26, 28, 30 generally between the first and second collars 36, 38. The actuators 40 are prevented from rotating by the housing of the transmission assembly 11. Referring to the actuator 41 on the first output shaft 24, the actuator 41 is coupled to each of the first and second collars 36, 38 for slidably moving the first and second collars 36, 38 laterally, as is described below. The actuator 41 is operable between a neutral position, a first position disposed laterally away from the neutral position toward the first gear 18.1, and a second position disposed laterally away from the neutral position toward the eighth gear 22.1. The housing of the transmission assembly 11 may include stops that determine the first and second positions of the actuator 41. The actuator 41 includes a third female spline lock (not shown) that is adapted for engaging with the third male spline lock 35.3 on the outer shaft portion 34 of the first output shaft 24. In the neutral position, the actuator 41 is engaged with the third male spline lock 35.3, the first collar 36 is disengaged from the first male spline lock 35.1, and the second collar 38 is disengaged from the second male spline lock 35.2 such that the first output shaft 24 does not rotate. With the actuator 41 in the neutral position and in response to rotation of the input shaft 12, the first collar 36 rotates with rotation of the first gear 18.1 and the second collar 38 rotates with rotation of the eighth gear 22.1, but the first output shaft 24 remains stationary.

In response to moving the actuator 41 laterally to the first position, the first and second collars 36, 38 move with the actuator 41 along the outer shaft portion 34 of the first output shaft 24. The actuator 41 disengages from the third male spline lock 35.3 and urges the first collar 36 to engage with the first male spline lock 35.1 on the outer shaft portion 34 of the first output shaft 24. With the actuator 41 in the first position such that the first collar 36 is engaging the first male spline lock 35.1, the first output shaft 24 is rotated in the counterclockwise direction by rotation of the first gear 18.1 in response to rotation of the input shaft 12.

Alternatively, in response to moving the actuator 41 laterally to the second position, the first and second collars 36, 38 move with the actuator 41 along the outer shaft portion 34 of the first output shaft 24. The actuator 41 disengages from the third male spline lock 35.3 and urges the second collar 38 to engage with the second male spline lock 35.2 on the outer shaft portion 34 of the first output shaft 24. With the actuator 41 in the second position such that the second collar 38 is engaging the second male spline lock 35.2, the first output shaft 24 is rotated in the clockwise direction by rotation of the eighth gear 22.1 in response to rotation of the input shaft 12. Similar operation is contemplated for the actuators 41 on each of the second, third, and fourth output shafts 26, 28, 30.

Figure 4:
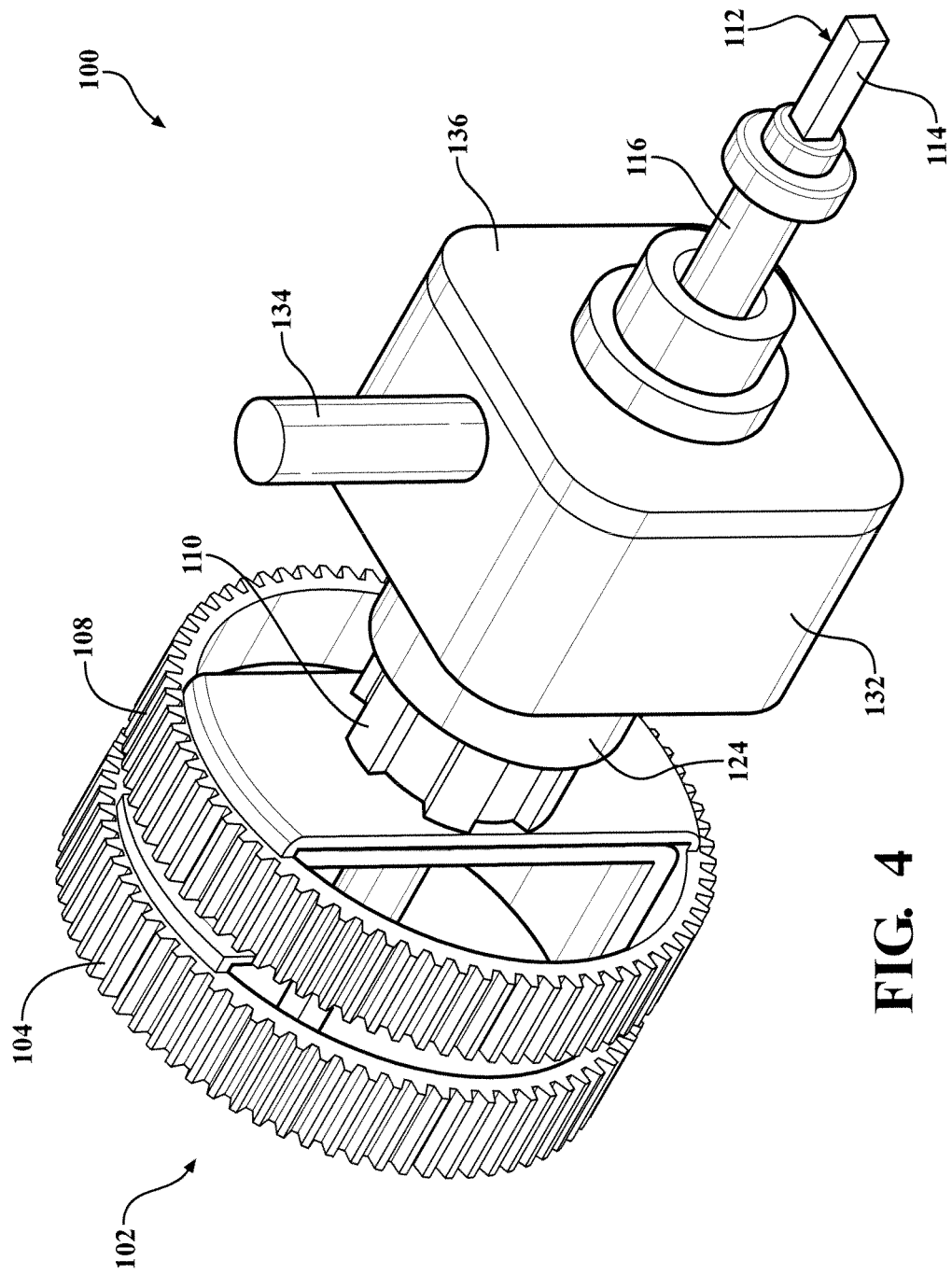
FIG. 4 is a fragmentary, perspective view of a multi-output transmission assembly for a power seat adjuster according to a second embodiment of the invention.
Figure 5A:
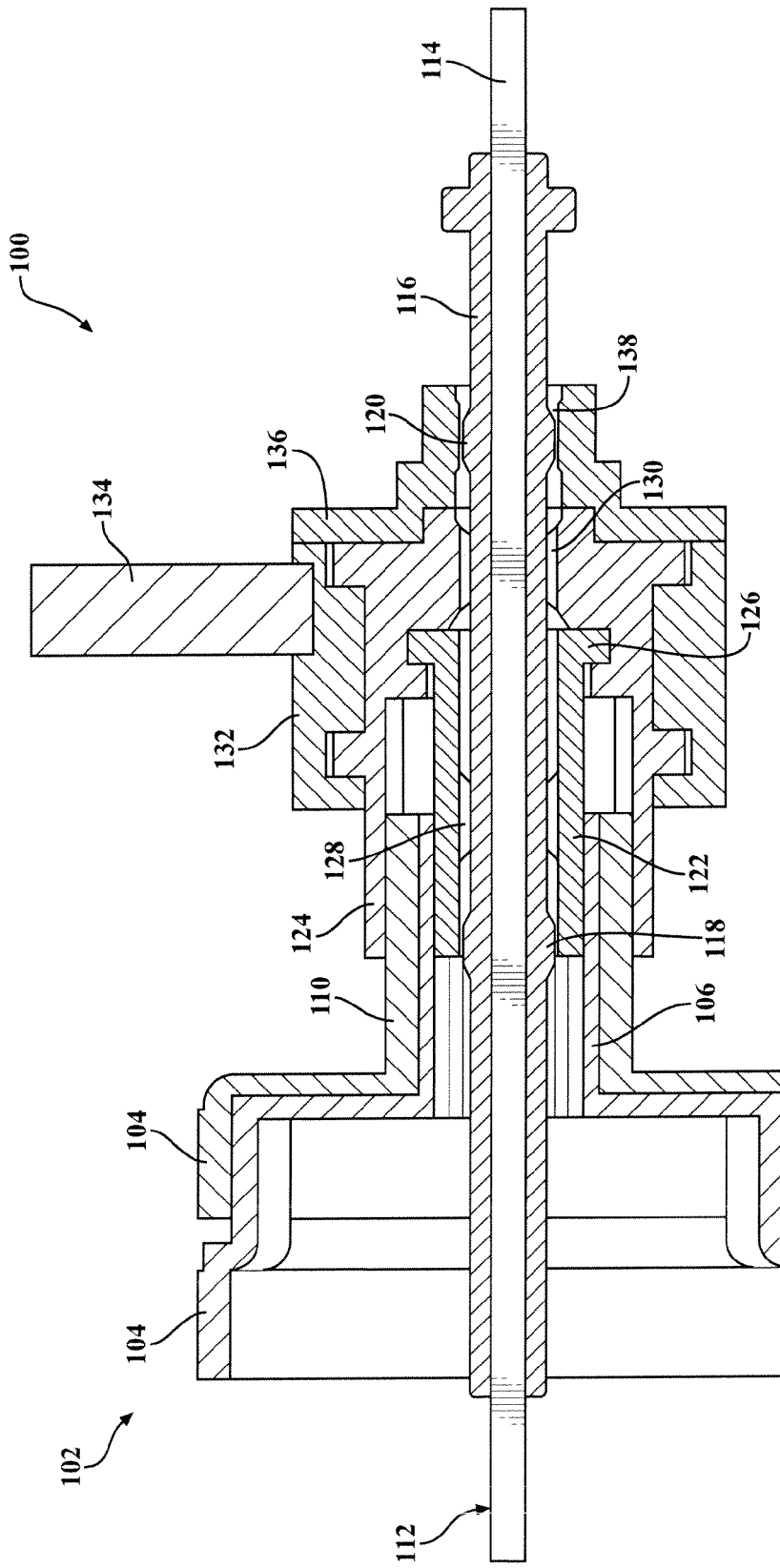
FIG. 5A is a cross-section view of the multi-output transmission assembly of FIG. 4 with an actuator in a neutral position.
Figure 5B:
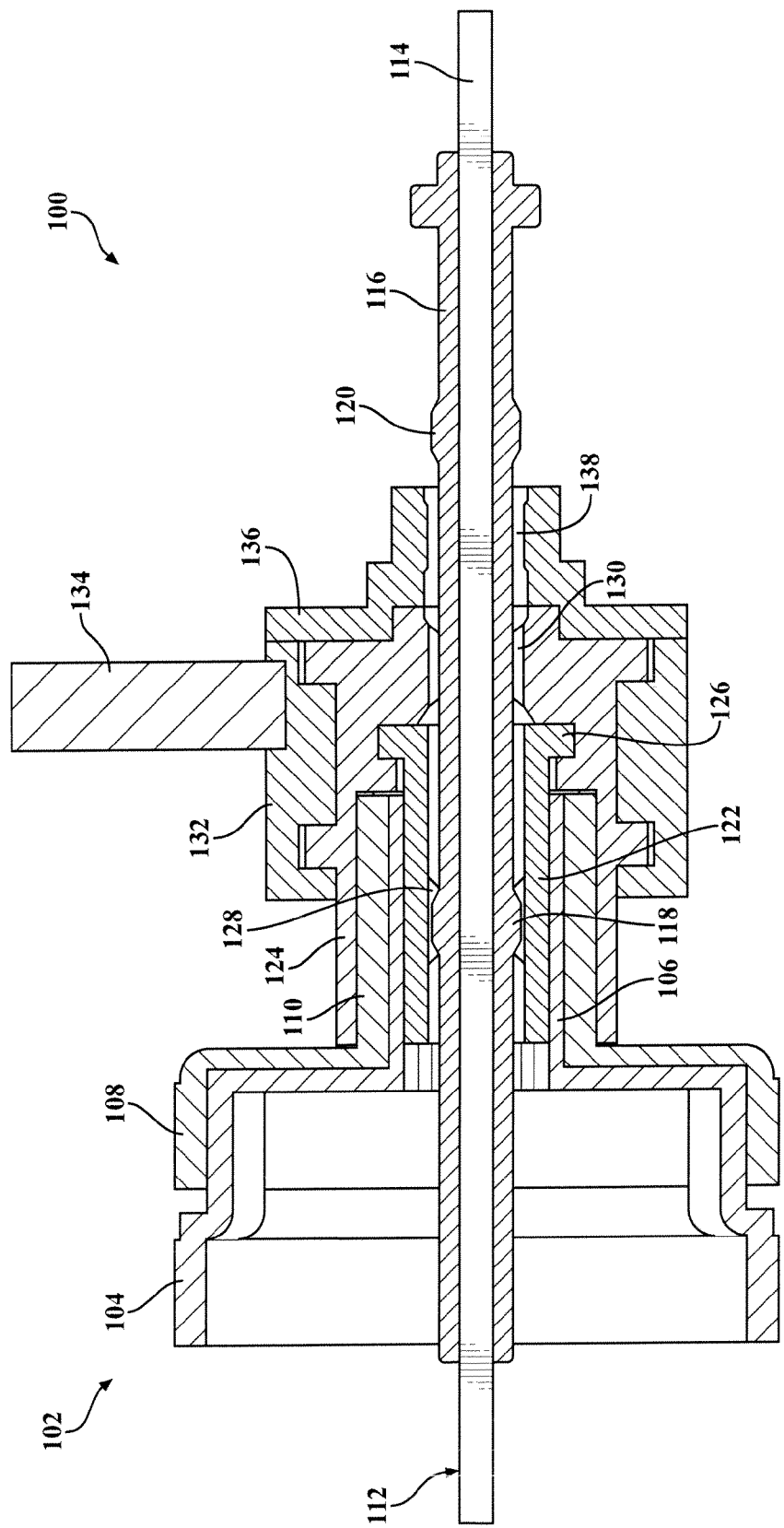
FIG. 5B is a cross-section view of the multi-output transmission assembly of FIG. 4 with the actuator in a first position.
Figure 5C:
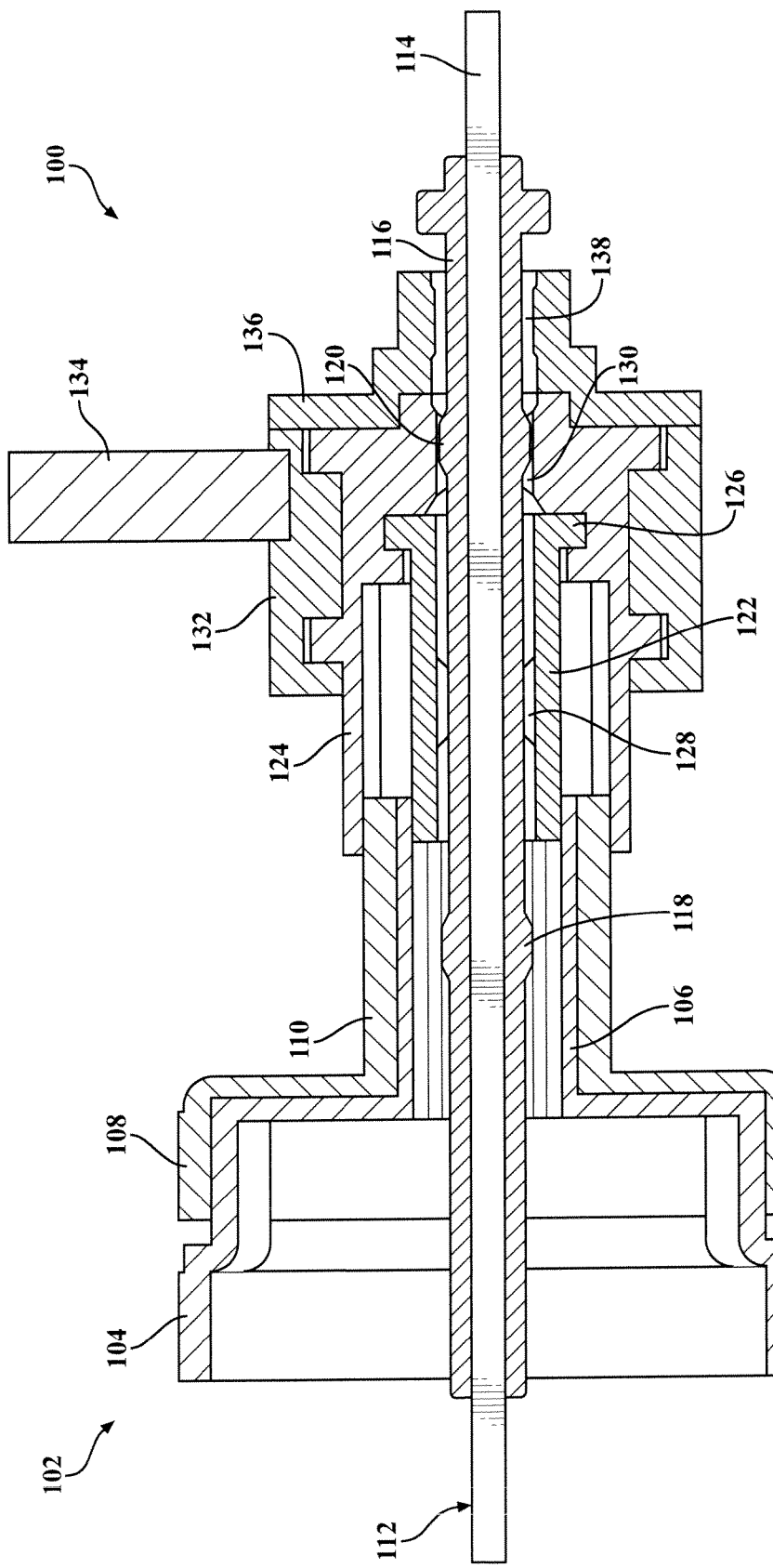
FIG. 5C is a cross-section view of the multi-output transmission assembly of FIG. 4 with the actuator in a second position.
Figure 6:
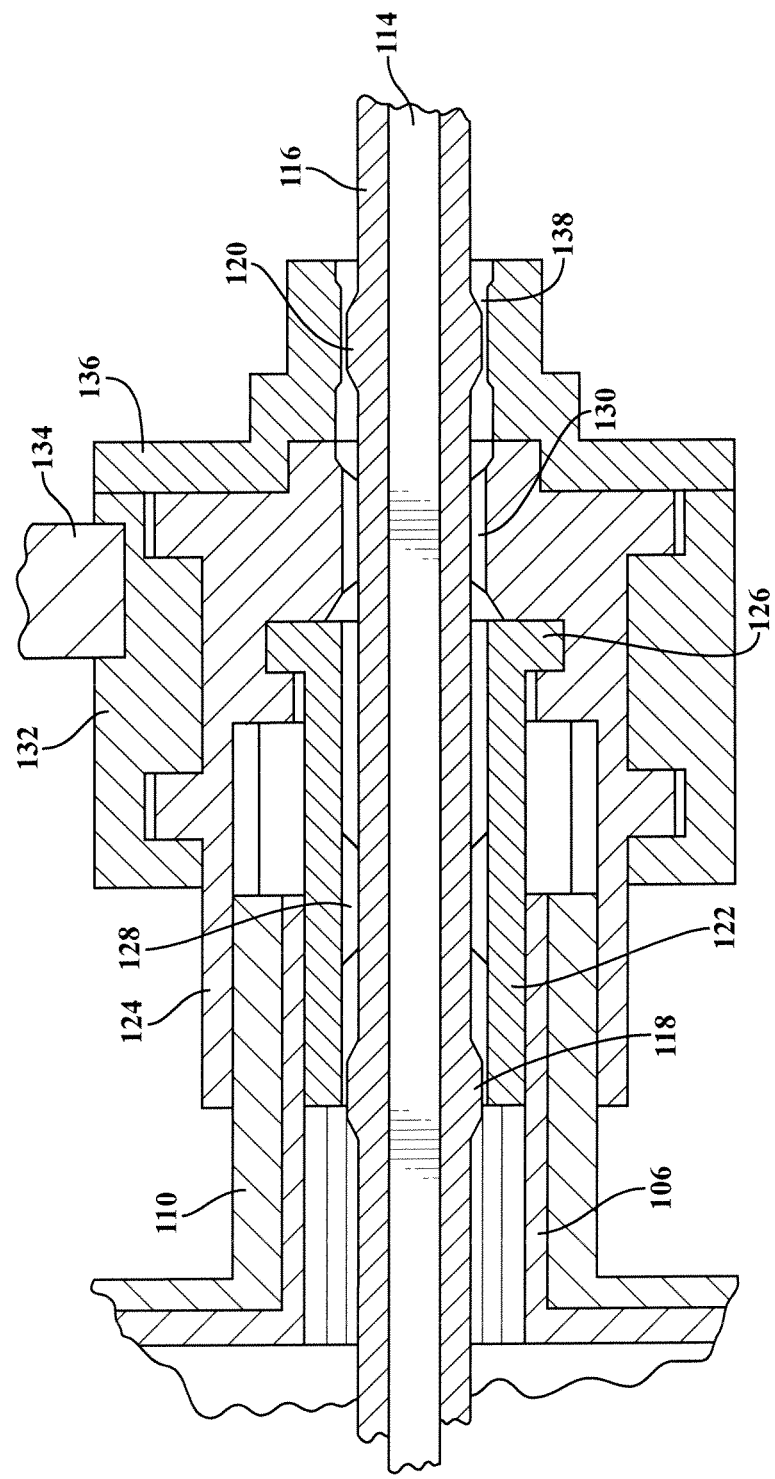
FIG. 6 is an enlarged view of the cross-section shown in FIG. 5A.

In a second embodiment of the invention, shown in FIGS. 4 through 6, a power seat adjuster 100 for a motor vehicle seat assembly includes a single motor (not shown) that is coupled to a multi-output transmission assembly 102. Only a portion of the multi-output transmission assembly 102 is shown in the Figures. The transmission assembly 102 includes a housing (not shown) and an input shaft (not shown) driven by the motor. First and second drive gears (not shown) are mounted on the input shaft for rotation therewith. The first drive gear drives a first input gear 104 in a first rotational direction, for example, clockwise. The first input gear 104 includes a neck 106 extending laterally therefrom. The second drive gear drives a second input gear 108 in a second rotational direction, for example, counterclockwise. More specifically, the second drive gear meshingly engages a reverse idler gear (not shown), which in turn meshingly engages the second input gear 108. The second input gear 108 includes a neck 110 extending laterally therefrom. The neck 106 of the first input gear 104 extends within the neck 110 of the second input gear 108, as shown in FIGS. 5A through 6, however, the first and second input gears 104, 108 are not fixed together. As such, the first and second input gears 104, 108 are free to rotate in opposite directions.

The transmission assembly 102 also includes an output shaft 112 that extends laterally through the necks 106, 110 of the respective first and second input gears 104, 108. The output shaft 112 includes an inner shaft portion 114 extending through and fixed to an outer shaft portion 116. The inner shaft portion 114 of the output shaft 112 is adapted to be operatively coupled to an adjustment device of the seat assembly. For example, the adjustment device can be a seat track drive for moving the seat assembly fore and aft, a front lift drive for lifting or tilting a front end of a seat cushion, a rear lift drive for lifting or tilting a rear end of the seat cushion, or a recliner drive for pivoting a seat back relative to the seat cushion.

The outer shaft portion 116 of the output shaft 112 includes two male spline locks that are laterally spaced apart, namely, a first male spline lock 118 and a second male spline lock 120. The first male spline lock 118 is disposed toward the first and second input gears 104, 108 and the second male spline lock 120 is disposed away from the first and second input gears 104, 108. First and second collars 122, 124 are slidably mounted on the outer shaft portion 116 of the output shaft 112. More specifically, the first collar 122 is disposed within the second collar 124 and includes a flange 126 that is received by the second collar 124 to couple the first and second collars 122, 124 together. The first and second collars 122, 124 are coupled together such that they move laterally along the output shaft 112 as a single unit, however, like the first and second input gears 104, 108, the first and second collars 122, 124 are free to rotate in opposite directions. As such, the first collar 122 rotates with the first input gear 104 in the clockwise direction and the second collar 124 rotates with the second output gear 108 in the counterclockwise direction, as is described below.

The neck 106 of the first input gear 104 is internally splined. The first collar 122 is externally splined and is engaged with the internal splines of the neck 106 such that the first collar 122 rotates with the first input gear 104 in the clockwise direction. The splined engagement allows the first collar 122 to move laterally relative to the first input gear 104. The first collar 122 also includes a first female spline lock 128 that is adapted for selectively engaging with the first male spline lock 118 on the outer shaft portion 116 of the output shaft 112.

The neck 110 of the second input gear 108 is externally splined. The second collar 124 is internally splined and is engaged with the external splines of the neck 110 such that the second collar 124 rotates with the second input gear 108 in the counterclockwise direction. The splined engagement allows the second collar 124 to move laterally relative to the second input gear 108. The second collar 124 also includes a second female spline lock 130 that is adapted for selectively engaging with the second male spline lock 120 on the outer shaft portion 116 of the output shaft 112.

An actuator 132 with an actuation pin 134 and a backplate 136 is coupled to the second collar 124 for slidably moving the first and second collars 122, 124 laterally, as is described below. The first and second collars 122, 124 are free to rotate relative to the actuator 132. The actuator 132 itself is prevented from rotating by the housing of the transmission assembly 102. The actuator 132 is operable between a neutral position, shown in FIG. 5A, a first position disposed laterally away from the neutral position toward the first and second input gears 104, 108, shown in FIG. 5B, and a second position disposed laterally away from the neutral position and away from the first and second input gears 104, 108, shown in FIG. 5C. The housing of the transmission assembly 102 may include stops that determine the first and second positions of the actuator 132. The backplate 136 includes a third female spline lock 138 that is adapted for selectively engaging with the second male spline lock 120 on the outer shaft portion 116 of the output shaft 112. In the neutral position, the actuator 132, and more specifically the third female spline lock 138 in the backplate 136, is engaged with the second male spline lock 120 such that the output shaft 112 does not rotate. With the actuator 132 in the neutral position, the first collar 122 is disengaged from the first male spline lock 118 on the outer shaft portion 116 of the output shaft 112 and the second collar 124 is disengaged from the second male spline lock 120 on the outer shaft portion 116 of the output shaft 112. Further, with the actuator 132 in the neutral position and in response to rotation of the input shaft, the first collar 122 rotates with the first input gear 104 and the second collar 124 rotates with the second input gear 108, but the output shaft 112 remains stationary.

In response to moving the actuator 132 laterally to the first position, as shown in FIG. 5B, the first and second collars 122, 124 move with the actuator 132 along the output shaft 112 toward the first and second input gears 104, 108. The third female spline lock 138 disengages from the second male spline lock 120 and urges the first female spline lock 128 in the first collar 122 to engage with the first male spline lock 118 on the outer portion 116 of the output shaft 112. With the actuator 132 in the first position such that the first collar 122 is engaging the first male spline lock 118, the output shaft 112 is rotated by the first input gear 104 in the clockwise direction in response to rotation of the input shaft.

Alternatively, in response to moving the actuator 132 laterally to the second position, as shown in FIG. 5C, the first and second collars 122, 124 move with the actuator 132 along the output shaft 112 away from the first and second input gears 104, 108. The third female spline lock 138 disengages from the second male spline lock 120 and urges the second female spline lock 130 in the second collar 124 to engage with the second male spline lock 120 on the outer portion 116 of the output shaft 112. With the actuator 132 in the second position such that the second collar 124 is engaging the second male spline lock 120, the output shaft 112 is rotated by the second input gear 108 in the counterclockwise direction in response to rotation of the input shaft.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A multi-output transmission assembly for a power seat adjuster, said multi-output transmission assembly comprising:
    a first gear set;
    a second gear set;
    a first output shaft;
    a first collar slidably coupled to said first output shaft and rotated by said first gear set in a first rotational direction, wherein said first collar is selectively engaged with said first output shaft for rotating said first output shaft;
    a second collar slidably coupled to said first output shaft and rotated by said second gear set in a second rotational direction, opposite said first rotational direction, wherein said second collar is selectively engaged with said first output shaft for rotating said first output shaft; and
    a first actuator coupled to said first and second collars for sliding said first and second collars along said first output shaft;
    wherein said first actuator moves between a neutral position preventing rotation of said first output shaft, a first position wherein said first collar is engaged with said first output shaft to rotate said first output shaft in said first rotational direction in response to actuation of said first gear set, and a second position wherein said second collar is engaged with said first output shaft to rotate said first output shaft in said second rotational direction in response to actuation of said second gear set.

2. The multi-output transmission assembly set forth in claim 1 including an input shaft that actuates said first gear set to rotate said first collar in said first rotational direction and simultaneously actuates said second gear set to rotate said second collar in said second rotational direction in response to rotation of said input shaft.

3. The multi-output transmission assembly set forth in claim 2 wherein said first and second collars rotate relative to said first output shaft when said first actuator is in said neutral position.

4. The multi-output transmission assembly as set forth in claim 3 wherein said first output shaft includes a first male spline lock, a second male spline lock, and a third male spline lock disposed laterally between said first and second male spline locks, and wherein said first actuator is engaged with said third male spline lock when said first actuator is in said neutral position, said first collar is engaged with said first male spline lock when said first actuator is in said first position, and said second collar is engaged with said second male spline lock when said first actuator is in said second position.

5. The multi-output transmission assembly set forth in claim 4 including a second output shaft, a third collar slidably coupled to said second output shaft and selectively engaged with said second output shaft for rotating said second output shaft, and a fourth collar slidably coupled to said second output shaft and selectively engaged with said second output shaft for rotating said second output shaft, wherein said second output shaft is rotatable in said first and second rotational directions independently of said first output shaft.

6. The multi-output transmission assembly set forth in claim 5 including a second actuator coupled to said third and fourth collars for sliding said third and fourth collars along said second output shaft, wherein said second actuator moves between a neutral position preventing rotation of said second output shaft, a first position wherein said third collar is engaged with said second output shaft to rotate said second output shaft in said first rotational direction in response to rotation of said input shaft, and a second position wherein said fourth collar is engaged with said second output shaft to rotate said second output shaft in said second rotational direction in response to rotation of said input shaft.

7. The multi-output transmission assembly set forth in claim 6 including a third output shaft, a fifth collar slidably coupled to said third output shaft and selectively engaged with said third output shaft for rotating said third output shaft, and a sixth collar slidably coupled to said third output shaft and selectively engaged with said third output shaft for rotating said third output shaft, wherein said third output shaft is rotatable in said first and second rotational directions independently of said first and second output shafts.

8. The multi-output transmission assembly set forth in claim 7 including a third actuator coupled to said fifth and sixth collars for sliding said fifth and sixth collars along said third output shaft, wherein said third actuator moves between a neutral position preventing rotation of said third output shaft, a first position wherein said fifth collar is engaged with said third output shaft to rotate said third output shaft in said first rotational direction in response to rotation of said input shaft, and a second position wherein said sixth collar is engaged with said third output shaft to rotate said third output shaft in said second rotational direction in response to rotation of said input shaft.

9. The multi-output transmission assembly set forth in claim 8 including a fourth output shaft, a seventh collar slidably coupled to said fourth output shaft and selectively engaged with said fourth output shaft for rotating said fourth output shaft, and an eighth collar slidably coupled to said fourth output shaft and selectively engaged with said fourth output shaft for rotating said fourth output shaft, wherein said fourth output shaft is rotatable in said first and second rotational directions independently of said first, second, and third output shafts.

10. The multi-output transmission assembly set forth in claim 9 including a fourth actuator coupled to said seventh and eighth collars for sliding said seventh and eighth collars along said fourth output shaft, wherein said fourth actuator moves between a neutral position preventing rotation of said fourth output shaft, a first position wherein said seventh collar is engaged with said fourth output shaft to rotate said fourth output shaft in said first rotational direction in response to rotation of said input shaft, and a second position wherein said eighth collar is engaged with said fourth output shaft to rotate said fourth output shaft in said second rotational direction in response to rotation of said input shaft.

11. The multi-output transmission assembly set forth in claim 10 wherein said first gear set includes a first gear meshingly engaging a second gear, said second gear meshingly engaging a third gear, said third gear meshingly engaging a first ring gear, said first ring gear meshingly engaging fourth and fifth gears, at least one of said fourth and fifth gears meshingly engaging a sixth gear, and said sixth gear meshingly engaging a seventh gear, wherein said first gear is coupled with said first collar for rotating said first collar, said fourth gear is coupled with said third collar for rotating said third collar, said fifth gear is coupled with said fifth collar for rotating said fifth collar, and said seventh gear is coupled with said seventh collar for rotating said seventh collar.

12. The multi-output transmission assembly set forth in claim 11 wherein said input shaft includes a first drive gear meshingly engaging said first gear.

13. The multi-output transmission assembly set forth in claim 12 wherein said second gear set includes an eighth gear meshingly engaging a ninth gear, said ninth gear meshingly engaging a tenth gear, said tenth gear meshingly engaging a second ring gear, said second ring gear meshingly engaging eleventh and twelfth gears, at least one of said eleventh and twelfth gears meshingly engaging a thirteenth gear, and said thirteenth gear meshingly engaging a fourteenth gear, wherein said eighth gear is coupled with said second collar for rotating said second collar, said eleventh gear is coupled with said fourth collar for rotating said fourth collar, said twelfth gear is coupled with said sixth collar for rotating said sixth collar, and said fourteenth gear is coupled with said eighth collar for rotating said eighth collar.

14. The multi-output transmission assembly set forth in claim 13 wherein said input shaft includes a second drive gear meshingly engaging an idler gear, said idler gear meshingly engaging said eighth gear.

15. A multi-output transmission assembly for a power seat adjuster, said multi-output transmission assembly comprising:
    a first input gear selectively rotatable in a first rotational direction;
    a second input gear selectively rotatable in a second rotational direction, opposite said first rotational direction;
    an output shaft;
    a first collar slidably coupled to said output shaft and rotated in said first rotational direction by said first input gear, wherein said first collar is selectively engaged with said output shaft for rotating said output shaft;
    a second collar slidably coupled to said output shaft and rotated in said second rotational direction by said second input gear, wherein said second collar is selectively engaged with said output shaft for rotating said output shaft: and
    an actuator coupled to said first and second collars for sliding said first and second collars along said output shaft;
    wherein said actuator moves between a neutral position preventing rotation of said output shaft, a first position wherein said first collar is engaged with said output shaft to rotate said output shaft in said first rotational direction in response to rotation of said first input gear in said first rotational direction, and a second position wherein said second collar is engaged with said output shaft to rotate said output shaft in said second rotational direction in response to rotation of said second input gear in said second rotational direction.

16. The multi-output transmission assembly as set forth in claim 15 wherein said first and second collars rotate relative to said output shaft when said actuator is in said neutral position.

17. The multi-output transmission assembly as set forth in claim 16 wherein said output shaft includes a first male spline lock and a second male spline lock, said first and second male spline locks laterally spaced apart, and wherein said first collar includes a first female spline lock for selectively engaging said first male spline lock when said actuator is in said first position, and wherein said second collar includes a second female spline lock for selectively engaging said second male spline lock when said actuator is in said second position.

18. The multi-output transmission assembly as set forth in claim 17 wherein said actuator includes a third female spline lock for selectively engaging said second male spline lock when said actuator is in said neutral position.

19. The multi-output transmission assembly as set forth in claim 18 wherein said first input gear includes a first neck and said second input gear includes a second neck, said first neck extending axially within said second neck.

20. The multi-output transmission assembly as set forth in claim 19 wherein said first neck is internally splined and said first collar is externally splined for splined engagement with said first neck, and wherein said second neck is externally splined and said second collar is internally splined for splined engagement with said second neck.

21. The multi-output transmission assembly as set forth in claim 20 wherein said first collar extends axially within said second collar, and wherein said output shaft extends axially through said first neck and said first collar.

* * * * *